Nov. 25, 1941.    F. P. MILLER    2,264,049
ICE BREAKER
Filed March 2, 1940    2 Sheets-Sheet 2
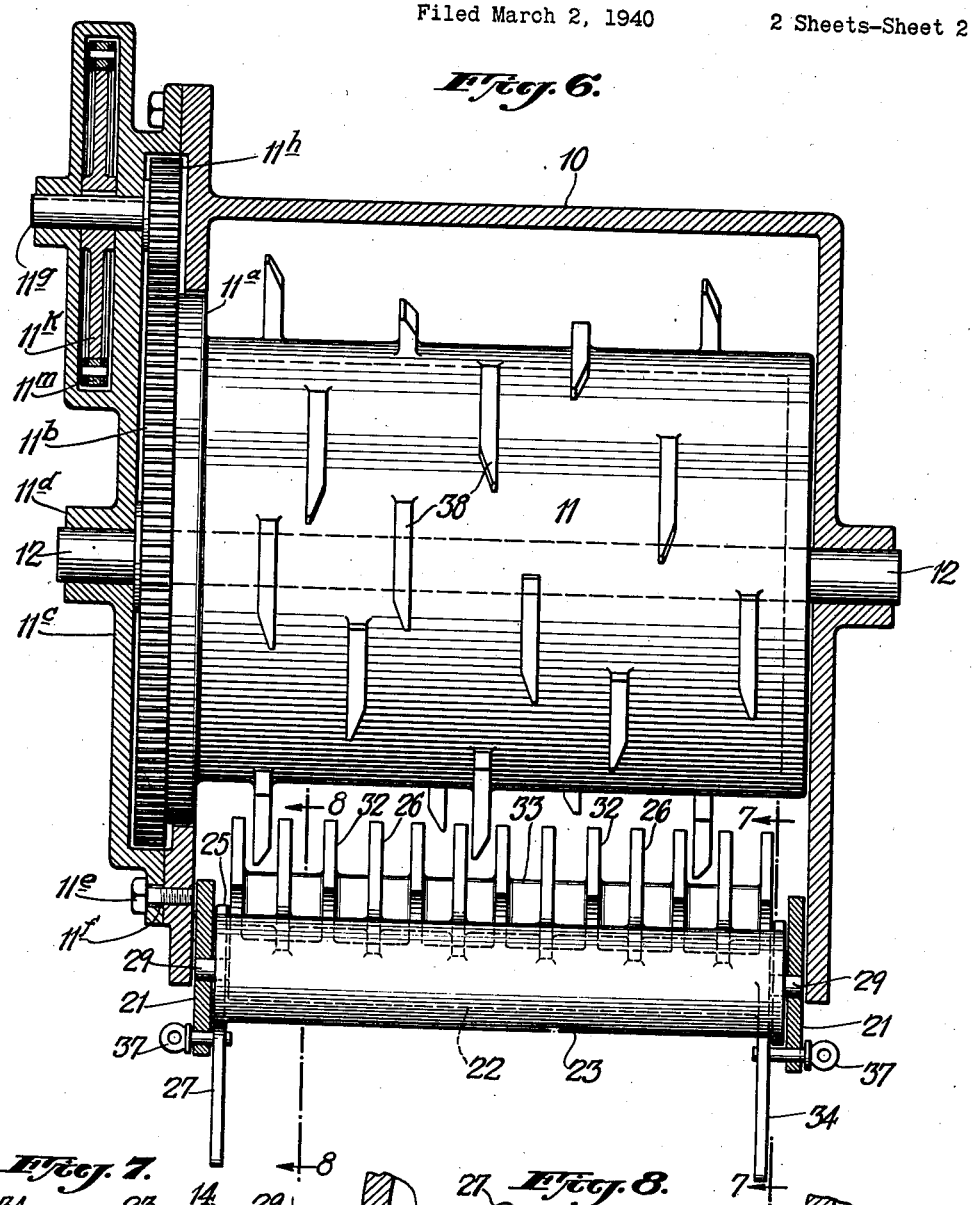
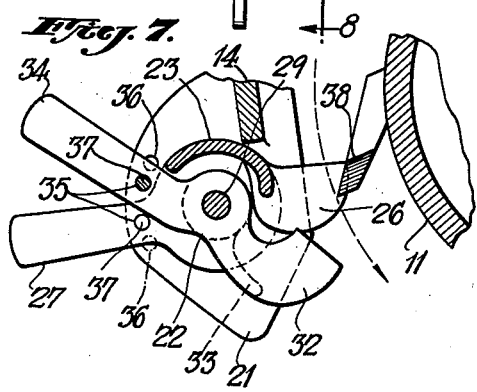
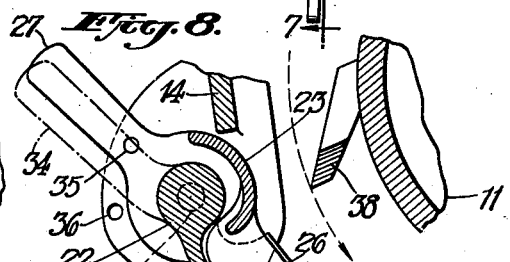
INVENTOR.
FRANKLIN P. MILLER.
BY Howard P. Kina
ATTORNEY.

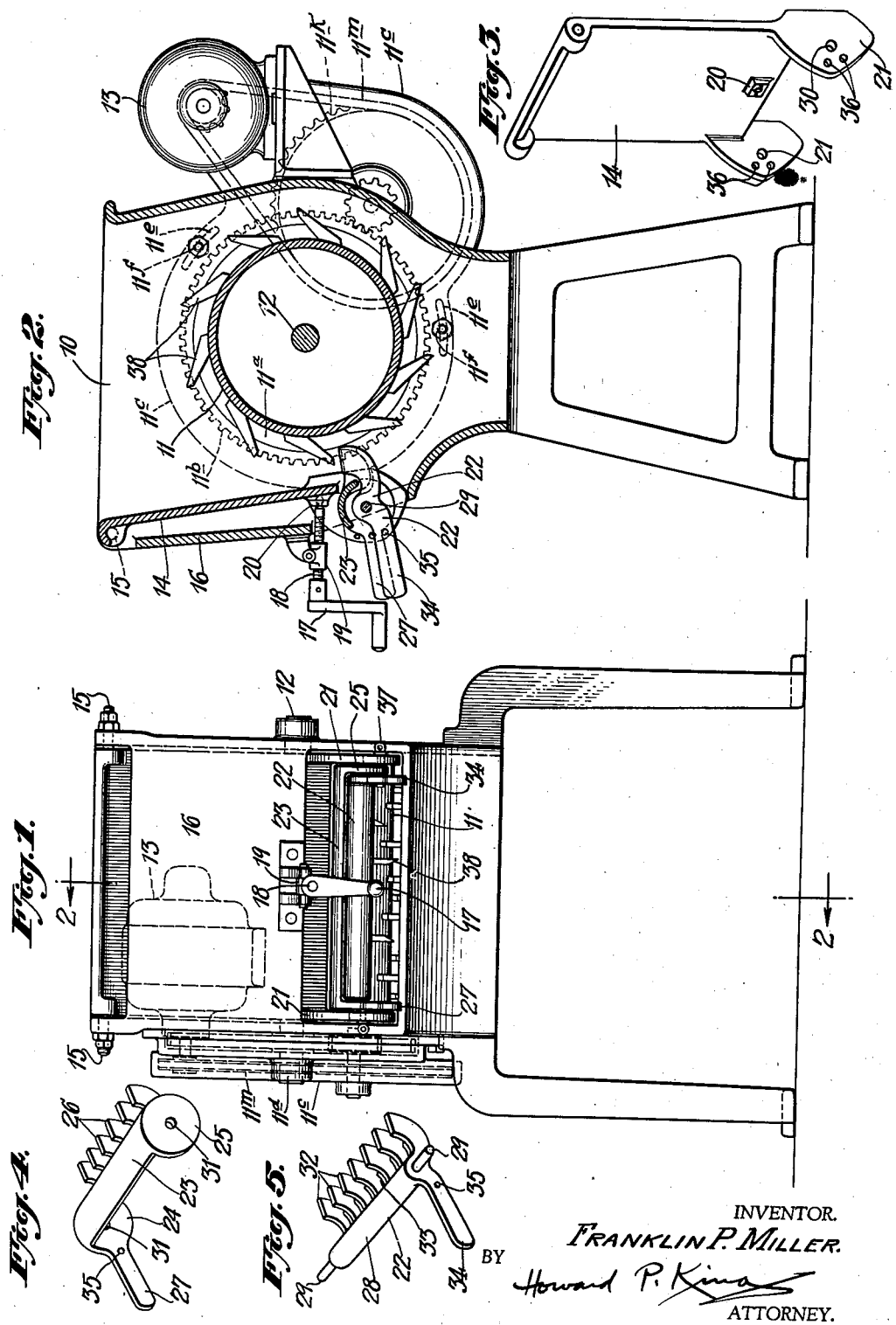

Patented Nov. 25, 1941

2,264,049

UNITED STATES PATENT OFFICE 2,264,049

ICE BREAKER

Franklin P. Miller, East Orange, N. J., assignor to Franklin P. Miller & Son, Inc., a corporation of New Jersey Application March 2, 1940, Serial No. 321,807

7 Claims. (Cl. 83—63)

This invention relates to ice breakers and particularly to ice breakers for reducing cakes of ice to relatively small chunks for use in packing ice cream freezers, for use at bars and soda fountains and so forth.

The objects of the invention are to provide an ice breaker which will effectively break the ice to sizes desired; to enable the same breaker to be readily employed for breaking the ice to one of several sizes; to provide for quick change of parts to permit breaking the desired ice for any particular customer; to enable the change to be made without having to remove or replace any material parts; to provide a multiple comb for varying the size of chunks obtained; to provide a sturdy construction without unnecessary bulkiness; to secure simplicity of construction and operation; and to obtain other advantages and results as may be brought out in the following description.

Referring to the accompanying drawings in which like numerals of reference indicate similar parts throughout the several views:

Figure 1 is a front elevation of an ice breaker embodying my invention;

Figure 2 is a vertical central sectional view on line 2—2 of Figure 1;

Figure 3 is a perspective view of the movable front plate in the hopper;

Figures 4 and 5 are perspective views of the comb members;

Figure 6 is a sectional plan at substantially the elevation of the drum and comb axes;

Figure 7 is a sectional view on line 7—7 of Figure 6 with one comb member swung down; and Figure 8 is a sectional view on line 8—8 of Figure 6 with both combs swung down.

In the specific embodiment of the invention illustrated in said drawings, the reference numeral 10 designates a hopper within which is situated a drum 11 upon an axle 12 extending crosswise of the hopper. The hopper is upwardly open for receiving cakes of ice and the drum is situated below the top of the hopper so as to form at least a partial bottom upon which the cake of ice will rest. The drum revolves forwardly downward and is driven by any suitable means, such as through the agency of an electric motor 13 and an appropriate train of gearing and sprocket chain here shown as one example for purposes of being definite.

According to the present showing, drum 11 is rotatable upon shaft 12 and at one end of the drum is a flange 11a to which is attached a large gear 11b at the outer end of the drum beyond the flange. This gear is contained within a housing 11c which has a central hub 11d forming a support for the projecting end of shaft 12. The housing is bolted to the side of the hopper by bolts 11e which pass through arcuate slots 11f in the housing, the center of curvature of the said slots being coincident with the center of said shaft 12 and thus enabling the housing to be twisted or rotated within limits upon the shaft and then clamped by said bolts 11e. The housing also supports stub shaft 11g on which is mounted a pinion 11h in mesh with said gear 11b said pinion being keyed to the stub shaft and said stub shaft also having a sprocket wheel 11k keyed thereon within the said housing. On the sprocket gear is a sprocket chain 11m which extends around the small sprocket on the motor shaft. By virtue of the construction above described enabling the housing to be rotated within limits, the sprocket chain can be tightened by appropriate rotation of the housing about the shaft 12 as a center and the housing then clamped in position by bolts 11e. Should the sprocket chain or belt stretch, it is accordingly a simple matter to tighten the same by loosening the bolts and rotating the housing an appropriate amount for the purpose, after which the bolts will be retightened. While I have shown and specifically mentioned a sprocket chain, it is to be understood that the same is an example of any usual form of belt drive.

At the front of the hopper is shown a movable or swinging plate 14 hung at its upper edge by studs 15 upon which the plate may swing. Outside of the swinging plate 14 is a fixed front wall 16 of the hopper and the swinging plate is limited in forward position by engagement with this fixed wall. It may, however, be swung inwardly toward the drum a considerable distance, and this swinging is utilized for one adjustment to vary the size of the chunks of ice which may pass between the drum and plate. A suitable crank 17 is provided at the front of the hopper carrying a screw 18 which passes through a swiveled mounting 19 carried by the fixed front wall and said screw having its inner end mounted in a boss 20 at the front of the swinging plate.

At the lower side edges of the swinging plate are provided enlarged ears 21, 21 which are substantially perpendicular to the plane of the plate and constitute means for mounting a comb crosswise of and next the lower edge of the plate. Said comb preferably is formed as two members, one, designated by numeral 22 nesting within the other member designated by numeral 23. Said member 23 is constituted as clearly shown in the several figures as a partial cylinder with circular end pieces 24, 25 which are situated next the said ears 21, 21 of the swinging plate and flatwise in relation to said ears. Integral with the cylindrical portion are a plurality of teeth 26 which extend outwardly away from the said cylindrical portion and inwardly of the hopper. These teeth 26 have a spacing one from the other which will determine the size of the largest chunk of ice which can pass through the comb. These teeth are evenly spaced and parallel to each other and are situated at intervals entirely across the length of the comb. Projecting in a direction diametrically opposite from the teeth 26 is a handle 27 by which the comb member may be swung up and down by the operator, this handle projecting outwardly of the hopper at a position below the front wall 16 and at one side of the machine.

The other comb member, illustrated in detail in Figure 5, nests within the cylindrical portion of the first mentioned comb member and provides substantially a cylindrical core portion 28 the length of which is equal to the distance between the end pieces 24, 25 of the outer comb member 23. Suitable pins or trunnions 29 are inserted through appropriate alined holes 30 in the ears of the movable plate, said pins passing through central holes 31 in the end pieces 24, 25 of the outer comb member and into a socket provided in the ends of the core portion 28 of the inner comb member 22. Accordingly, both comb members are supported by the pins and enabled to oscillate upon said pins as an axis. The inner comb member also provides parallel evenly spaced teeth 32 integral with the core portions and reinforced by intervening webs 33 next the core portion and at the bottom of the teeth 32. These teeth 32 of the inner comb member alternate with respect to the teeth of the outer comb member, so that as shown in Figure 6, when both comb members are swung up with the upper edges of the teeth in a common plane, the successive teeth are evenly spaced and reduce the gaps through which chunks of ice may pass to approximately one half of the distance between the teeth of either member. When the members are in the position just mentioned, the under edges of the teeth of the outer comb member rest upon the web 33 of the inner comb member and thus have an additional support or reinforcement by such engagement. The inner comb member 22 is also provided with a handle 34 projecting forwardly below the front wall 16 of the hopper and this handle is preferably at the opposite end of the comb from the handle 27 of the other member. Each handle is shown provided with a hole alined with either one of two holes 36 in the adjacent ear of the movable plate 14 whereby a pin 37 can be inserted through one of the holes 36 and the alined hole 35 of the comb member and thus retain the comb in either one of its positions.

When only one comb is swung upwardly, as in Figure 7, it will be appreciated that the full distance between the teeth of that comb will determine the size of chunks of ice that can pass through the comb. When the other comb member also is swung upwardly, as in Figures 2 and 6, the distance between the teeth is substantially one half of the distance where only one comb is employed, and thus the size of chunks will be very much smaller. The operator can very readily swing the inner comb member up and down and lock it with pin 37 in accordance with the size of chunks which any customer being served may desire. In the event larger chunks are required than can pass through the teeth of one comb member alone, both comb members may be swung down as in Figure 8, and then the determining distance between the movable plate and drum will regulate the maximum size of chunks. Swinging of the plate accordingly has its function in determining the size of chunks in addition to the separate use of one comb member or simultaneous use of both comb members.

Suitable prongs 38 are carried by the drum for chopping through the ice. These prongs are situated at appropriate positions crosswise of the drum so as to pass between the teeth of the combs at such time as said combs are swung to their upward position. It is preferred, as clearly indicated in Figure 6 that the said prongs have a promiscuous situation with respect to each other upon the drum rather than having symmetrical or even disposition. This promiscuous arrangement has been found advantageous in chopping or breaking ice in that it affords the ice opportunity to move sideways as the drum rotates and avoids merely cutting grooves or ruts in the ice. The lateral displacement of the ice during the chopping operation is an important consideration, and in order to augment the movement, it is preferred to taper the prongs from one side of the same to a point at the opposite side of the prong. In other words, the lateral tapering of any prong is entirely in one direction. However, the tapering of one prong may be in one direction and the tapering of an adjacent prong may be in the opposite direction, the utilization of this opposite tapering also being promiscuous and thus enabling the taper of the prongs to move the ice back and forth until it is broken into pieces small enough to pass between the teeth of the comb or between the drum and the comb. It is within the scope of the invention to attach the prongs to the drum in any desired manner, such as by welding or by any suitable means.

I claim:

1. An ice breaker for securing ice chunks of desired sizes comprising a hopper having a movable front plate, a comb trunnioned at its ends to the said front plate so as to be movable with respect to said plate, said comb having teeth of which some are movable with respect to others for enabling the ice chunks passing the comb to be regulated in size, means for retaining said teeth stationary in use, and means cooperating with said teeth for feeding and crushing ice past the comb.

2. An ice breaker for securing ice chunks of desired sizes comprising a hopper having a movable front plate, a comb trunnioned at its ends to the said front plate so as to be movable with respect to said plate, said comb comprising two members of which one nests within the other and each have teeth alternating with respect to the teeth of the other for enabling the ice chunks passing the comb to be regulated in size, and means cooperating with said teeth for feeding and crushing ice past the comb.

3. An ice breaker for securing ice chunks of desired sizes comprising a hopper having a movable front plate, a comb trunnioned at its ends to the said front plate so as to be movable with respect to said plate, said comb comprising two members of which one nests within the other and both rotatable on a common axis, each member having teeth, one of said members being rotatable on its trunnions for optionally bringing said teeth into or out of ice-breaking relation with respect to the teeth of the other member, and means cooperating with said teeth for feeding and crushing ice past the comb.

4. An ice breaker for securing ice chunks of desired sizes comprising a hopper having a movable front plate, a comb trunnioned at its ends to the said front plate so as to be movable with respect to said plate, said comb comprising two members of which one nests within the other and both rotatable on a common axis, said members each having teeth alternating with respect to the teeth of the other member, means on each comb member for swinging the same to desired position, and means cooperating with said teeth for feeding and crushing ice past the comb.

5. An ice breaker for securing ice chunks of desired sizes comprising a hopper having a movable front plate, a comb trunnioned at its ends to the said front plate so as to be movable with respect to said plate, said comb comprising two members of which one nests within the other and both rotatable on a common axis, said members each having teeth alternating with respect to the teeth of the other member, means on each said comb member for swinging the same to desired position, means for retaining said comb members in position to which swung, and means cooperating with said teeth for feeding and crushing ice past the comb.

6. An ice breaker for securing ice chunks of desired sizes comprising a hopper having a movable front plate, a plurality of teeth projecting inwardly of the hopper and movable with said plate, a comb member trunnioned at its ends to the said front plate so as to be also movable with said plate, said member having teeth alternating with respect to the aforementioned teeth and movable into and out of spaces therebetween, and means cooperating with said teeth for feeding and crushing ice past the comb.

7. An ice breaker comprising a hopper, a drum in said hopper, a shaft supporting the drum, a housing rotatably mounted on said shaft, said housing having arcuate bolt slots enabling the housing to have limited rotation on the shaft, bolts passing through said slots holding the housing to said hopper, a sprocket wheel carried by said housing at a distance laterally from said shaft whereby said sprocket may be shifted for chain-tightening purposes by rotating said housing on the shaft, and a train of gears from the sprocket to the drum for driving the drum.

FRANKLIN P. MILLER.